Dec. 3, 1968     C. E. McMANAMA     3,414,028

BANDSAW GUIDE

Filed Oct. 18, 1965

INVENTOR.
CHARLES E. Mc MANAMA

United States Patent Office 3,414,028
Patented Dec. 3, 1968

3,414,028
BANDSAW GUIDE
Charles E. McManama, Potlatch, Idaho 83855
Filed Oct. 18, 1965, Ser. No. 496,983
2 Claims. (Cl. 143—165)

ABSTRACT OF THE DISCLOSURE

The present invention is a bandsaw guide comprising refinements of the guide surface holders whereby the holders are integrated into elongate members which are attached to a base or supporting standard where they may be adjusted therefrom angularly against the saw blade or laterally against the saw blade, and fixed thereupon in a desired adjusted position; to either compensate for guide wear or deflect the saw in a particular manner.

---

The band saw guide is particularly useful in machines where accessability to saw guide adjustment and inspection is awkward; such as sawmills which comprise a horizontal bandsaw which traverses closely upon its guide rails which straddle a log as in the applicant's Patent No. 3,285,301. The major advantages are the slim design thereby made practical which substantially adds to the maximum usable saw throat and the ease of accurate adjustment upon the saw in confined space or difficult accessability. To adjust, the sawguide supporting shanks are loosened upon their supporting standard, the attachment to which is such that these shanks may then be moved to any practical adjustment standard. When the shanks are retightened upon the supporting standard, this setting is rigidly retained until they are again loosened.

Referring now to the accompanying drawing.

Figure 1:
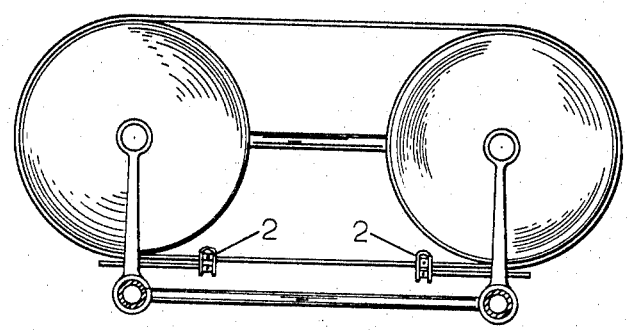
FIGURE 1 shows a back view of a horizontal bandsaw of the type heretofore mentioned.
Figure 3:
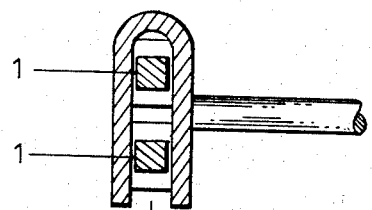
FIGURE 3 is a sectional view across line 3—3 in FIGURE 2.
Figure 2:
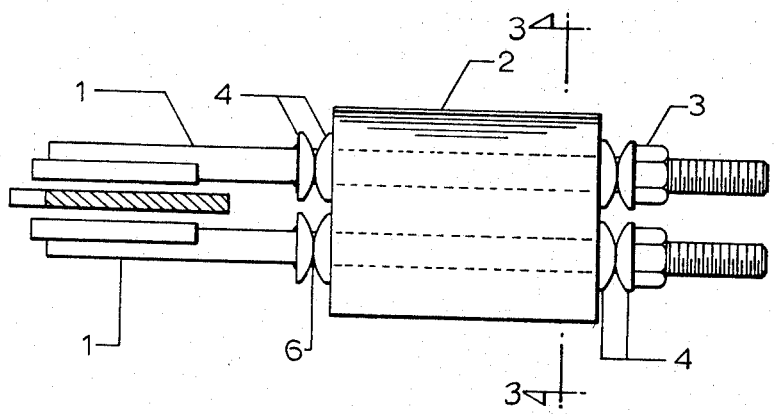
FIGURE 2 is an enlarged side view of the bandsaw guide proper.

As illustrated in the accompanying drawing, the guide supporting shanks 1 are mounted through slot 5 in the standard 2, and nuts 3 upon the threaded portion of the shanks are tightened against the end faces, which are approximately parallel to each other, of the standard. To provide a suitable bearing surface against the standard when the guide supporting shanks are set at an angle within the slot, special washers 4 have a horizontal pivoting center 6 are used. The unthreaded portion of the guide supporting shank is square, and the special washers 4 have matching square holes, both preventing rotation of the shank 1 in slot 5 and the special washers 4 upon the shank to assure that the pivotal rounding faces 6 remains in a horizontal plane.

The specific form used to describe the invention are intended in no way to limit the invention or its scope.

Having hereby described my invention which I desire to protect by Letters Patent, I claim:

1. A bandsaw guide comprising an elongated supporting standard having opposite parallel end faces aligned directly behind the bandsaw blade perpendicular to the plane of the bandsaw blade where being guided and a slot extending perpendicular to and intersecting said end faces; a pair of elongated guide members each having a guide surface adjacent one end thereof, an intermediate shank portion and threaded means on the end portion opposite said guide surface, said intermediate shank portions of a pair of said guide members being adjustably received in said slot whereby said guide surfaces are facing each other and are closely spaced from each other to guide the bandsaw blade therebetween, spaced washer means with a rounded face on said shank portion for engaging said end faces to permit angular adjustment of said guide members in said supporting standard; and said threaded means clamping said guide members upon said supporting standard.

2. In a bandsaw guide as set forth in claim 1, said intermediate shank portions extending through said slot having a squared cross section closely conforming to the sides of the slot, and each washer means having a matching hole.

References Cited

UNITED STATES PATENTS

| | | | |
|---|---|---|---|
| 134,704 | 1/1873 | Pryibil | 143—160 |
| 186,541 | 1/1877 | Chaffee | 143—166 |
| 233,563 | 10/1880 | Sherman | 143—160 |

DONALD R. SCHRAN, *Primary Examiner.*